United States Patent
Ko

(10) Patent No.: US 11,506,350 B2
(45) Date of Patent: Nov. 22, 2022

(54) OUTDOOR LIGHTING LAMP

(71) Applicant: Joseph Y. Ko, Laguna Niguel, CA (US)

(72) Inventor: Joseph Y. Ko, Laguna Niguel, CA (US)

(*) Notice: Subject to any disclaimer, the term of this patent is extended or adjusted under 35 U.S.C. 154(b) by 216 days.

(21) Appl. No.: 17/085,712

(22) Filed: Oct. 30, 2020

(65) Prior Publication Data
US 2022/0136668 A1   May 5, 2022

(51) Int. Cl.
| | |
|---|---|
| *F21S 9/03* | (2006.01) |
| *F21V 21/30* | (2006.01) |
| *F21V 23/04* | (2006.01) |
| *F21V 21/08* | (2006.01) |

(52) U.S. Cl.
CPC .......... *F21S 9/035* (2013.01); *F21V 21/0824* (2013.01); *F21V 21/30* (2013.01); *F21V 23/04* (2013.01)

(58) Field of Classification Search
CPC ...... F21V 21/0824; F21V 21/30; F21V 23/04; F21V 17/007; F21W 2131/103; F21W 2131/109; F21S 9/035; F21S 9/037; F21Y 2115/10; Y02B 20/72
See application file for complete search history.

(56) References Cited

U.S. PATENT DOCUMENTS

| | | | | |
|---|---|---|---|---|
| 5,055,984 | A * | 10/1991 | Hung ..................... | F21S 8/081 362/183 |
| 8,585,231 | B1 * | 11/2013 | May ....................... | F21S 9/037 362/276 |
| 2005/0248285 | A1 * | 11/2005 | Richmond ............. | F21S 10/04 315/149 |
| 2008/0084711 | A1 * | 4/2008 | Chen ................... | F21V 21/0824 362/648 |
| 2012/0327639 | A1 * | 12/2012 | Chen ...................... | F21S 9/035 362/183 |
| 2015/0023049 | A1 * | 1/2015 | Ellis ....................... | F21S 9/037 362/183 |
| 2016/0369960 | A1 * | 12/2016 | Ellis ..................... | G02B 6/0006 |
| 2020/0370721 | A1 * | 11/2020 | Scholl .................... | F21S 8/086 |

* cited by examiner

*Primary Examiner* — Kevin Quarterman
(74) *Attorney, Agent, or Firm* — Muncy, Geissler, Olds & Lowe, P.C.

(57) ABSTRACT

The present invention provides an outdoor lighting lamp comprising a ground inserted base including an assembly opening and a ground nail, and a lighting module including a first shell, a light projection gap, a light emitting component, and a solar panel connected with the light emitting component. The light generated by electrifying the light emitting component is only projected by the light projection gap. One end of the first shell is mounted at the assembly opening, and the first shell is forced to rotate relative to the ground inserted base based on an axis of the ground nail to be a rotation axis. The solar panel is arranged at one end of the first shell where is in an opposite direction of the ground inserted base and not in horizontal. The solar panel adjusts a light receiving position by rotating the first shell relative to the ground inserted base.

12 Claims, 6 Drawing Sheets

OUTDOOR LIGHTING LAMP

FIELD OF THE INVENTION

The invention relates to an outdoor lighting lamp, in particular to a lamp capable of adjusting a light receiving position of a solar panel and having safety.

BACKGROUND OF THE INVENTION

As a common lamp, a detachable LED ground lamp is commonly used for being inserted in places such as gardens, lawns, roadsides and the like for illumination, and it is fixed in a ground insertion mode, includes the characteristic of quick installation, and is also commonly used for outdoor camping illumination. In general, there are quite a number of ground lamps. One type of solar ground lamp uses solar energy to supply an electric energy for night lighting. However, the technology of the solar ground lamp is not mature enough. Although the solar energy is usually absorbed in all weather in the daytime, the phenomenon of insufficient electric power occurs in the use at night, and in consequence the lighting time at the night is short. When people have yet to rest, the lamp light is not bright any more. The solar ground lamp cannot be used for a long time, with poor actual application effect. The reason is mainly that the solar ground lamp is provided with a solar panel horizontally arranged at the top of the ground lamp all the time, so that the light receiving position of the solar panel cannot be adjusted along with the irradiation light of the sun, the absorption efficiency of the solar panel is poor, and the solar panel cannot fully absorb the solar energy in the daytime to cope with a long-time luminous use at night.

Accordingly, taking a ground lamp product TWIN-SLUXES SL2471D sold by the Amazon Store as an example, the ground lamp sold on the market is mainly inserted into soil and fixed by a ground nail at the bottom. However, the ground nail itself is a sharp part. Therefore, when the ground lamp is not inserted into the soil for use, the ground nail is exposed to the outside and is easy to cause accidental injury to people in a case it is additionally disassembled and placed. It is easy to lose or inconvenient to store the ground nail.

SUMMARY OF THE INVENTION

The main object of the present invention is to solve the problem that a conventional solar ground lamp cannot change a light receiving position of a solar panel.

Another object of the present invention is to solve the problem of accidental injury caused by exposure of a ground nail when the conventional ground lamp is not in use.

To achieve the above objects, the present invention provides an outdoor lighting lamp. The outdoor lighting lamp comprises a ground inserted base and a lighting module, wherein the ground inserted base includes an assembly opening and a ground nail. The lighting module includes a first shell, a light projection gap defined by the first shell, a light emitting component arranged in the first shell, and a solar panel arranged on a surface of the first shell and electrically connected with the light emitting component, wherein one end of the first shell is mounted at the assembly opening, and the first shell is forced to rotate relative to the ground inserted base based on an axis of the ground nail to be a rotation axis; and the solar panel is arranged at one end of the first shell where is in an opposite direction of the ground inserted base and not in horizontal, and wherein light generated by electrifying the light emitting component is only projected by the light projection gap In an embodiment, the light emitting component comprises a light emitting piece exposed in the light projection gap, a power supply component electrically connected with the solar panel and the light emitting piece, and a switch electrically connected with the power supply component and exposed on the surface of the first shell, wherein the power supply component is positioned between the solar panel and the light emitting piece, and the power supply component comprises at least one battery.

In an embodiment, the light emitting component includes a carrier plate which provides with the light emitting piece and the power supply component, and a cover in which the power supply component is arranged, wherein the carrier plate is parallel to the solar panel, and a component consisting of the carrier plate and the cover is mounted in the first shell.

In an embodiment, the ground inserted base includes a second shell which is formed with at least one first limiting piece at periphery of the assembly opening, and one end of the first shell of the lighting module assembled with the assembly opening is provided with at least one second limiting piece to coordinate with at least one first limiting piece, and after the first limiting piece and the second limiting piece are assembled, the first shell and the second shell are inseparable from each other, and the first shell is rotatable relative to the second shell.

In an embodiment, the at least one first limiting piece is a fixing convex ring formed at the periphery of the assembly opening of the second shell, and the second limiting piece is a first elastic arm formed at one end of the first shell.

In an embodiment, the first shell is divided into a light projection portion which is formed with the light projection gap and a diameter shrinkage portion which is contained in the assembly opening, wherein the first elastic arm is arranged on the diameter shrinkage portion, and the diameter shrinkage portion includes a hollowed area in which the first elastic arm is arranged, and the first elastic arm is provided with at least one connecting section which is connected with an edge of the hollowed area, and a clamping section is extended from the connecting section and facing the light projection portion to be matched with the fixing convex ring.

In an embodiment, the second shell comprises a tube body, and a cover arranged at one end of the tube body to provide with the ground nail thereon.

In an embodiment, one end of the tube body is formed with a rib on an inner edge where the cover is provided, and the cover comprises a plurality of second elastic arms matched with the rib to form a restraining relationship.

In an embodiment, an overall length of the tube body is greater than a length of the ground nail to store the ground nail therein.

In an embodiment, a retaining wall is provided at a side of the cover without providing the ground nail and extending into the tube body.

In an embodiment, t the cover is provided with at least one auxiliary ground nail on a side provided with the ground nail.

In an embodiment, an inner wall surface of the light projection gap is provided with a reflective layer.

Comparing with the conventional technology, the invention has the following characteristics: the lighting module and the ground inserted base are rotationally assembled, the solar panel is arranged at one end of the first shell where is in an opposite direction of the ground inserted base and not in horizontal, and the ground nail can be stored in the ground inserted base.

DETAILED DESCRIPTION OF THE PREFERRED EMBODIMENTS

Figure 1:
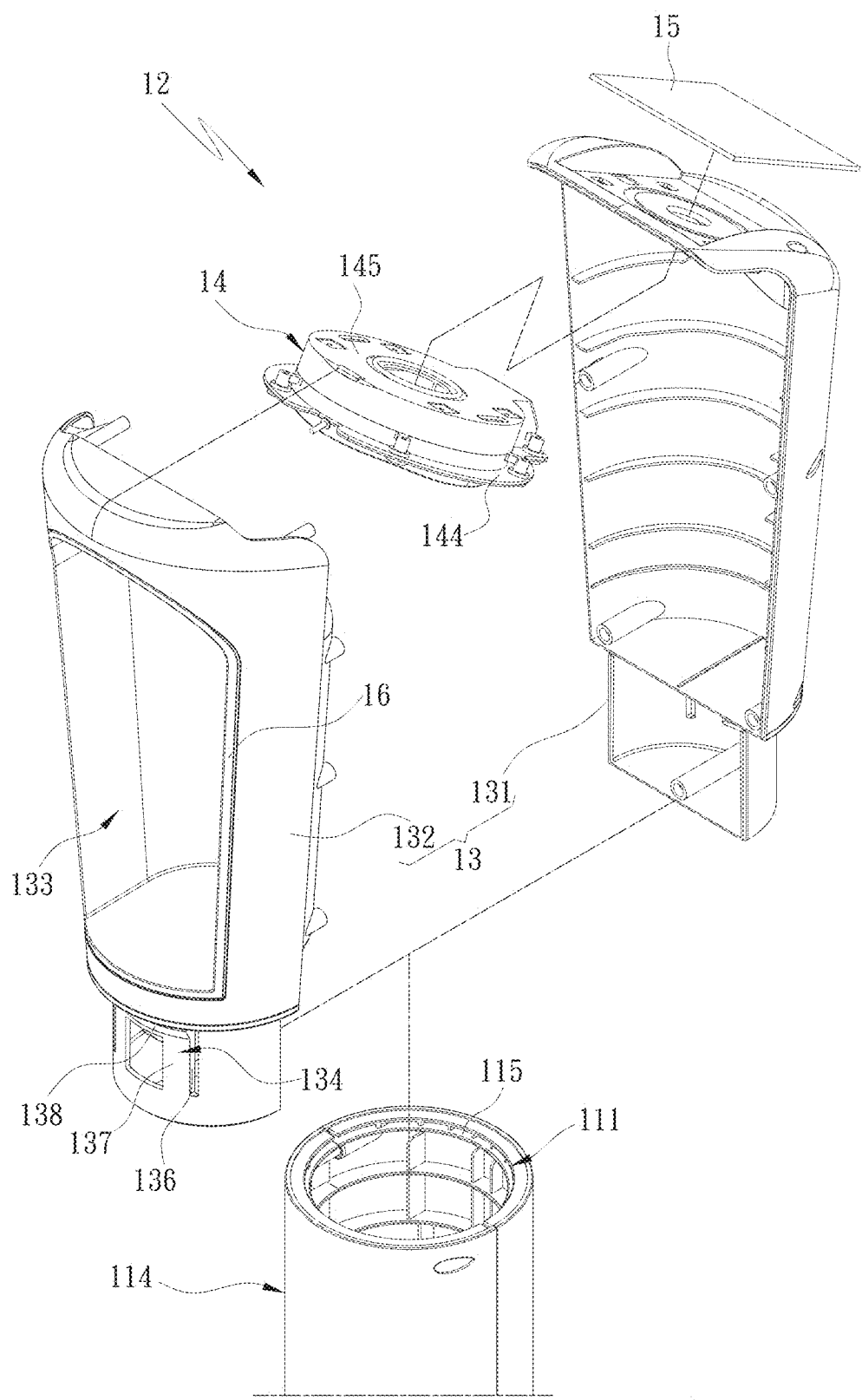
FIG. 1 is a first perspective exploded view of an embodiment of the present invention.

The detailed description and technical contents of the present invention will now be described with reference to the drawings as follows.

Referring to FIG. 1, FIG. 2, FIG. 3, FIG. 4 and FIG. 5, the present invention provides an outdoor lighting lamp 10 comprising a ground inserted base 11 and a lighting module 12. The ground inserted base 11 includes an assembly opening 111 and a ground nail 112. The lighting module 12 includes a first shell 13 which is formed by assembling two half shells 131, 132, a light projection gap 133 defined by the first shell, a light emitting component 14 arranged in the first shell 13, and a solar panel 15 arranged on a surface of the first shell 13 and electrically connected with the light emitting component 14. One end of the first shell 13 is mounted at the assembly opening 111 so that the lighting module 12 is integrated with the ground inserted base 11. The first shell 13 rotates relative to the ground inserted base 11, based on an axis 113 of the ground nail 112 to be a rotation axis, when being subjected to an external force. The solar panel 15 is arranged at one end of the first shell 13 where is in an opposite direction of the ground inserted base 11 and not in horizontal.

Figure 2:
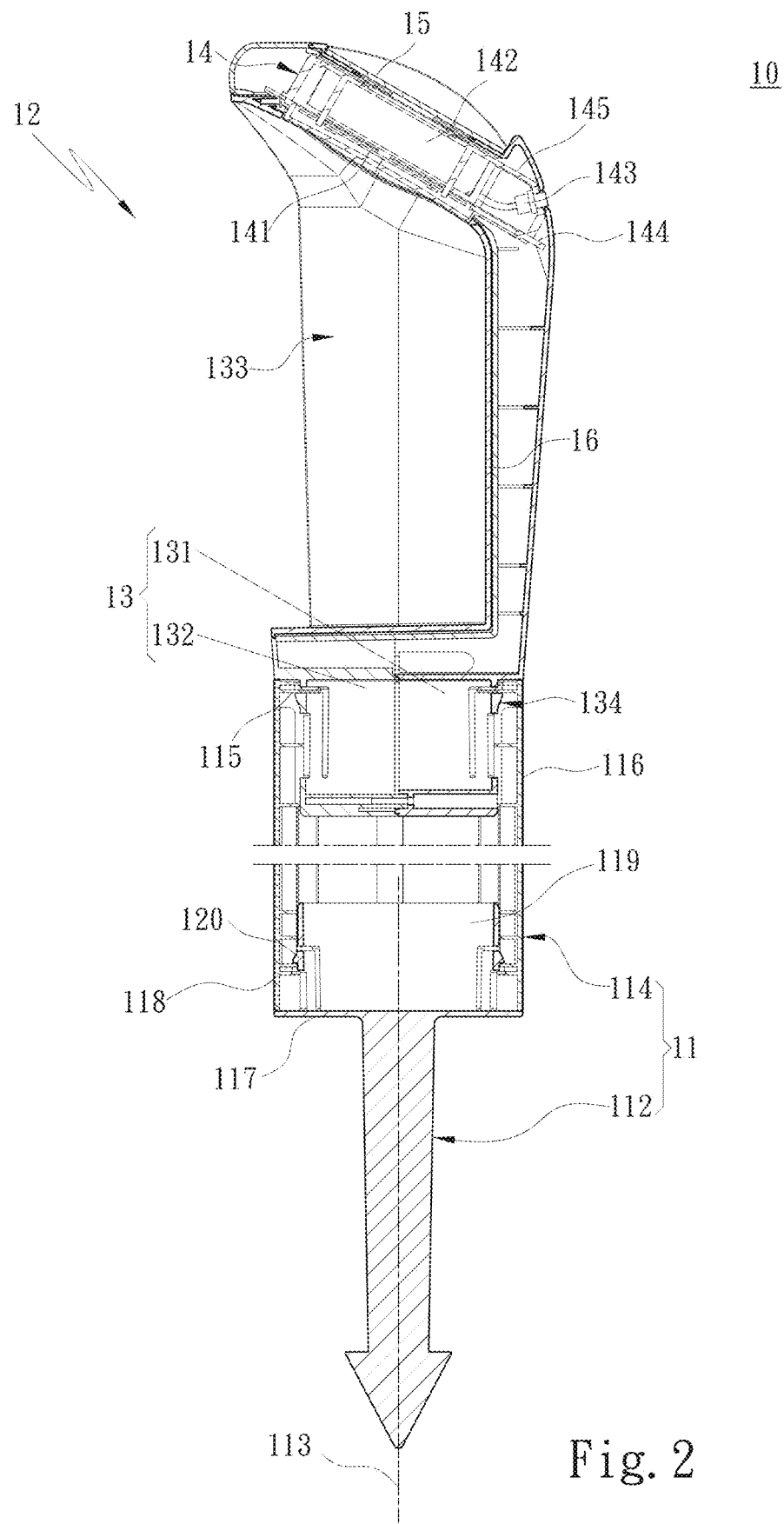
FIG. 2 is a cross-sectional side view of an embodiment of the present invention.
Figure 3:
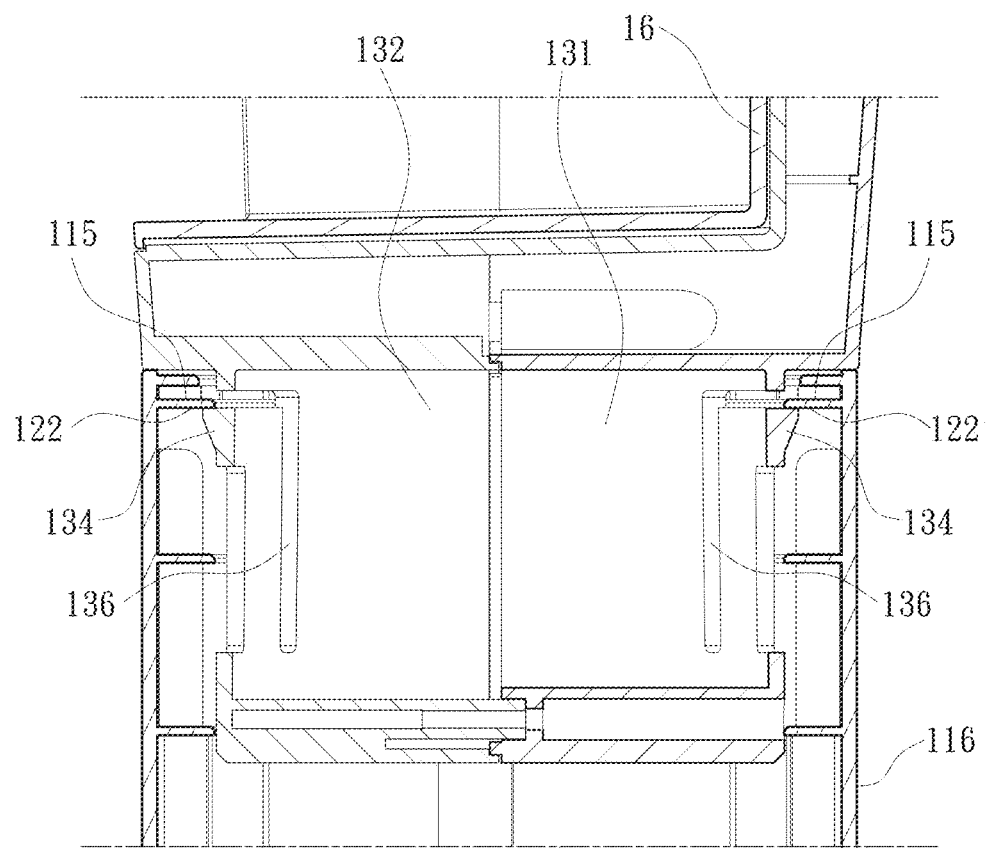
FIG. 3 is a partially cross-sectional side view of an embodiment of the present invention.

Referring to FIG. 2 and FIG. 3, the light emitting component 14 of the present invention is mainly arranged inside the first shell 13, and the light emitting component 14 comprises a light emitting piece 141 exposed in the light projection gap 133, a power supply component 142 electrically connected with the solar panel 15 and the light emitting piece 141, and a switch 143 electrically connected with the power supply component 142 and exposed on the surface of the first shell 13, wherein the power supply component 142 is positioned between the solar panel 15 and the light emitting piece 141. In one embodiment, the light emitting piece 141 is an LED lamp panel. As described above, the switch 143 is operated by a user to generate an on state or an off state. When the switch 143 is in the on state, the power supply component 142 supplies the power required by the light emitting piece 141 to emit light, and when the switch is in the off state, the power supply component 142 stops supplying the power required by the light emitting piece 141 to emit light. In addition, the power supply component 142 comprises at least one battery, and solar energy absorbed by the solar panel 15 is stored in the power supply component 142 in the form of electric power after being converted, so that the light emitting piece 141 generates light by the electric power provided by the power supply component 142, and the light generated is only projected by the light projection gap 133. In an embodiment, the light emitting component 14 includes a carrier plate 144 which provides with the light emitting piece 141 and the power supply component 142, and a cover 145 providing the power supply component 142 to be arranged therein. Specifically, the light emitting piece 141 is electrically connected with the power supply component 142 and arranged on the carrier plate 144, and covers the cover 145 on the carrier plate 144, so that the light emitting piece 141 and the power supply component 142 are completely coated by the carrier plate 144 and the cover 145. In addition, the carrier plate 144 is arranged in parallel to the solar panel 15, and a component consisting of the carrier plate 144 and the cover 145 is mounted in the first shell 13. Furthermore, in an embodiment, an inner wall surface of the light projection gap 133 is provided with a reflective layer 16, so that the light, generated after the light emitting piece 141 is driven, is emitted through the light projection gap 133 by refraction of the reflective layer 16 so as to generate stronger light source irradiation. The ground inserted base 11 includes a second shell 114 which is formed with at least one first limiting piece at the periphery of the assembly opening 111, and one end of the first shell 13 of the lighting module 12 assembled with the assembly opening 111 is provided with at least one second limiting piece to coordinate with the at least one first limiting piece. The ground inserted base 11 is assembled with the at least one second limiting piece of the lighting module 12 by the at least one first limiting piece, so that the first shell 13 and the second shell 114 cannot be separated but not in an fastened state after completing assembly.

The following description is the rotation of the lighting module 12 and the ground inserted base 11 in the present invention. Referring to FIG. 2, FIG. 3, FIG. 4 and FIG. 5, the at least one first limiting piece is a fixing convex ring 115 formed at the periphery of the assembly opening 111 of the second shell 114, and the at least one second limiting piece is a first elastic arm 134 formed at one end of the first shell 13, so that the ground inserted base 11 and the lighting module 12 are assembled by integrating the fixing convex ring 115 with the first elastic arm 134. Further, the first shell 13 is divided into a light projection portion 139 which is formed with the light projection gap 133 and a diameter shrinkage portion 135 which is contained in the assembly opening 111 of the second shell 114, wherein a diameter of the diameter shrinkage portion 135 is slightly smaller than a diameter of the first shell 13, so that the diameter shrinkage portion 135 is tapered with respect to the first shell 13, and the first elastic arm 134 is arranged outside the diameter shrinkage portion 135 so that the diameter shrinkage portion 135 is submerged into the assembly opening 111 of the second shell 114 when the first shell 13 and the second shell 114 are assembled. Upon completion of assembly of the first shell 13 and the second shell 114, the first elastic arm 134 formed at the diameter shrinkage portion 135 is further clamped to a plane 122 at the bottom of the fixing convex ring 115 of the assembly opening 111. As can be seen from FIG. 1 and FIG. 2, the fixing convex ring 115 surrounds an inner side edge formed at the assembly opening 111. Therefore, the first elastic arm 134 rotates along the plane 122 at the bottom of the fixing convex ring 115 when the first elastic arm 134 is clamped to the plane 122 of the fixing convex ring 115 and the first shell 13 is rotated by application of force, thereby rotating the first shell 13 relative to the second shell 114. Furthermore, when the solar panel 15 is assembled on the first shell 13 in an inclined state, the solar panel 15 rotates relative to the ground inserted base 11 by an inclined arrangement to coordinate with the first shell 13 and the solar panel 15 rotates relative to the second shell 114 via the first shell 13. A light receiving position of the solar panel 15 is able to be adjusted, and the solar panel 15 achieves better light receiving efficiency and sufficient solar energy absorption. Accordingly, after the outdoor lighting lamp 10 is fixed by inserting the ground nail 112 in places such as soil or grass, the light emitted by the light projection gap 133 is adjusted in the lighting angle and direction by rotating the lighting module 12 relative to the ground inserted base 11 due to the fact that the ground inserted base 11 and the lighting module 12 are in a rotationally matched assembling relationship.

Referring to FIG. 1, FIG. 2, FIG. 3 and FIG. 4, in an embodiment, the diameter shrinkage portion 135 includes a hollowed area 136 in which the first elastic arm 134 is arranged, and the first elastic arm 134 is provided with at least one connecting section 137 which is connected with the edge of the hollowed area 136, and a clamping section 138 which is extended from the connecting section 137 and facing the light projection portion 139 to be matched with the fixing convex ring 115. Referring to FIG. 2, in an embodiment, the second shell 114 comprises a tube body 116, and a cover 117 arranged at one end of the tube body 116 to provide with the ground nail 112 thereon, wherein one end of the tube body 116 is formed with a rib 118 on an inner edge where the cover 117 is provided, and a retaining wall 119 is provided at a side of the cover 117 without providing the ground nail 112 and extending into the tube body 116. The retaining wall 119 includes a plurality of third limiting pieces matched with the rib 118 to form a restraining relationship, and the cover 117 is assembled with the rib 118 of the tube body 116 through the third limiting pieces on the retaining wall 119 to secure the cover 117 at one end of the tube body 116. In an embodiment, each of the plurality of third limiting pieces is a second elastic arm 120 formed on the retaining wall 119.

Figure 4:
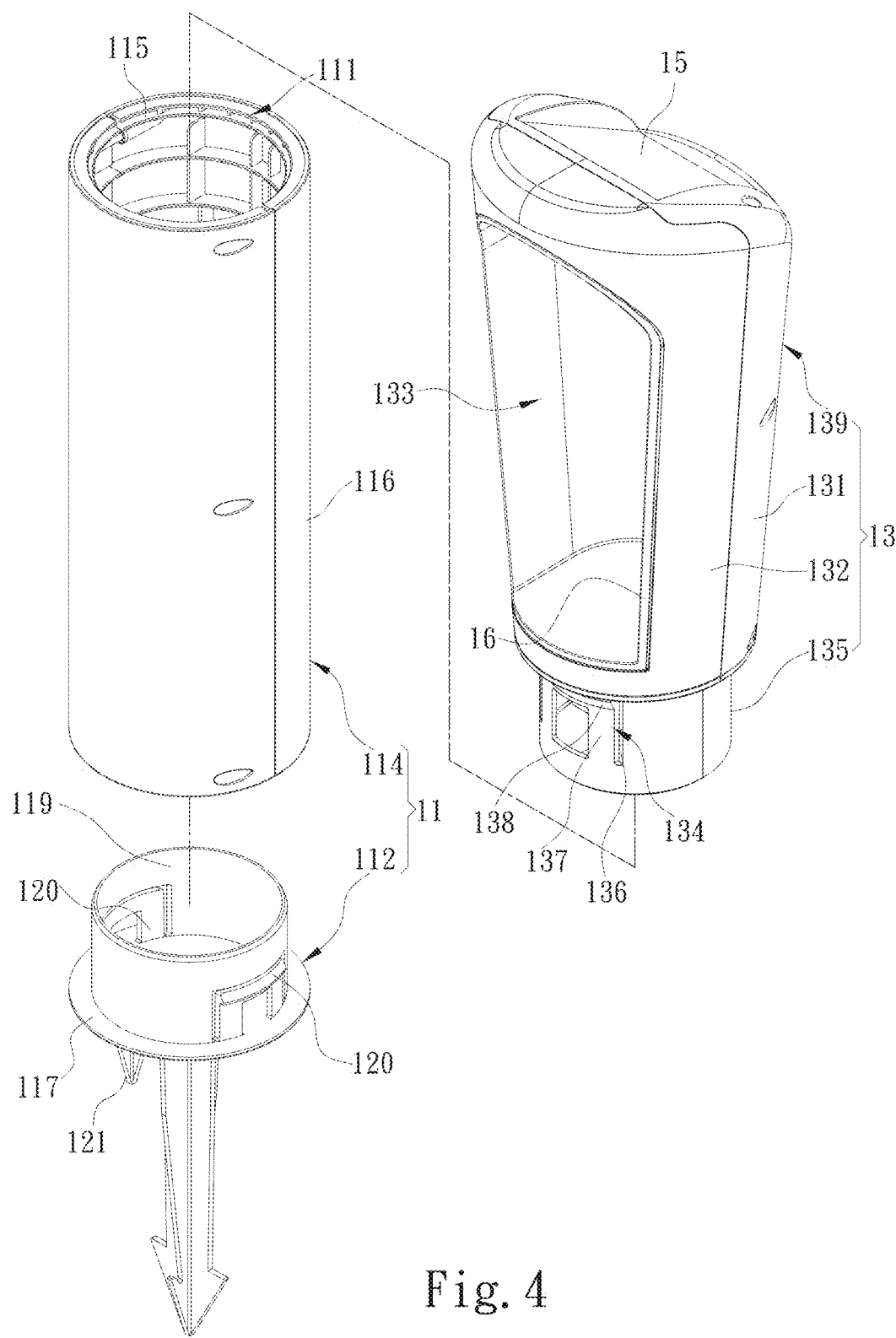
FIG. 4 is a second perspective exploded view of an embodiment of the present invention.
Figure 5:
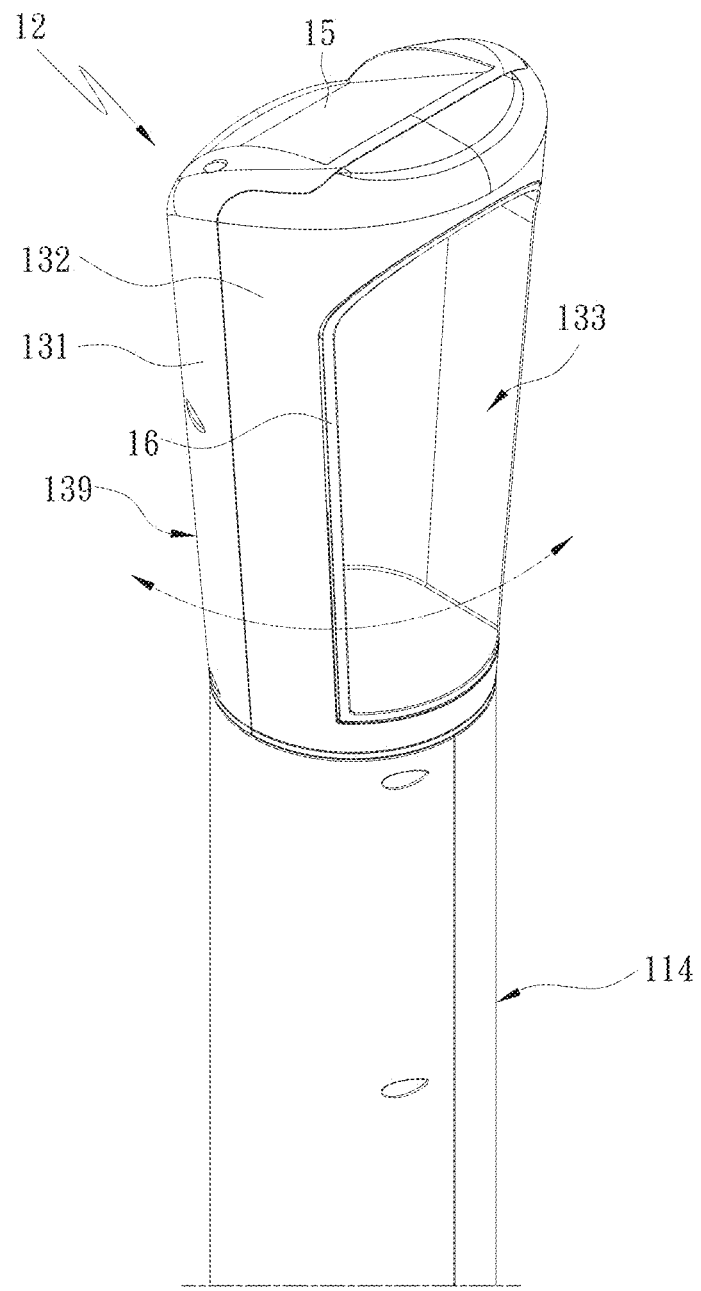
FIG. 5 is a first actuation view of an embodiment of the present invention.

Referring to FIG. 4, in order to increase the stability of the outdoor lighting lamp 10 to be fixed to the ground, in an embodiment, the cover 117 is provided with at least one auxiliary ground nail 121 on the side provided with the ground nail 112, and the at least one auxiliary ground nail 121 is shorter in length than the ground nail 112. When the ground nail 112 is inserted into the ground, the at least one auxiliary ground nail 121 is inserted into the ground along with the ground nail 112, so as to provide better stationary between the outdoor lighting lamp 10 and the ground.

Figure 6:
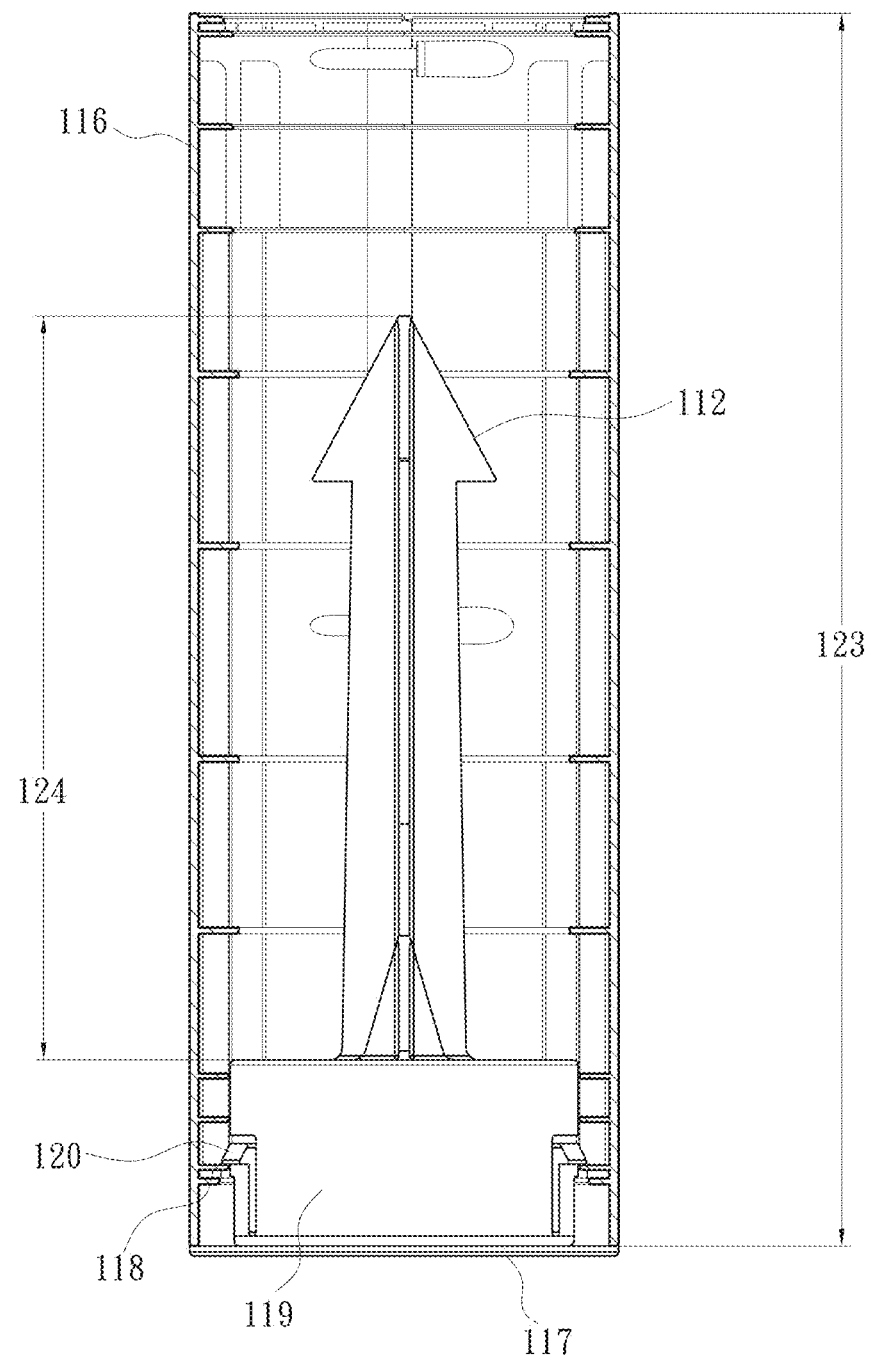
FIG. 6 is a second actuation view of an embodiment of the present invention.

Referring to FIG. 6, in order to further facilitate the storage of the ground nail 112, an overall length 123 of the tube body 116 is greater than a length 124 of the ground nail 112, so that the ground nail 112 can be stored in the tube body 116 in an inverted manner after the cover 117 is detached from the tube body 116.

What is claimed is:

1. An outdoor lighting lamp, comprising:
   a ground inserted base, including an assembly opening and a ground nail; and
   a lighting module, including a first shell, a light projection gap defined by the first shell, a light emitting component arranged in the first shell, and a solar panel arranged on a surface of the first shell and electrically connected with the light emitting component, wherein one end of the first shell is mounted at the assembly opening, and the first shell is forced to rotate relative to the ground inserted base based on an axis of the ground nail to be a rotation axis; and the solar panel is arranged at one end of the first shell where is in an opposite direction of the ground inserted base and not in horizontal, and wherein light generated by electrifying the light emitting component is only projected by the light projection gap.

2. The outdoor lighting lamp according to claim 1, wherein the light emitting component comprises a light emitting piece exposed in the light projection gap, a power supply component electrically connected with the solar panel and the light emitting piece, and a switch electrically connected with the power supply component and exposed on the surface of the first shell, wherein the power supply component is positioned between the solar panel and the light emitting piece, and the power supply component comprises at least one battery.

3. The outdoor lighting lamp according to claim 2, wherein the light emitting component includes a carrier plate which provides with the light emitting piece and the power supply component, and a cover in which the power supply component is arranged, wherein the carrier plate is parallel to the solar panel, and a component consisting of the carrier plate and the cover is mounted in the first shell.

4. The outdoor lighting lamp according to claim 3, wherein the ground inserted base includes a second shell which is formed with at least one first limiting piece at periphery of the assembly opening, and one end of the first shell of the lighting module assembled with the assembly opening is provided with at least one second limiting piece to coordinate with at least one first limiting piece, and after the first limiting piece and the second limiting piece are assembled, the first shell and the second shell are inseparable from each other, and the first shell is rotatable relative to the second shell.

5. The outdoor lighting lamp according to claim 4, wherein the at least one first limiting piece is a fixing convex ring formed at the periphery of the assembly opening of the second shell, and the second limiting piece is a first elastic arm formed at one end of the first shell.

6. The outdoor lighting lamp according to claim 5, wherein the first shell is divided into a light projection portion which is formed with the light projection gap and a diameter shrinkage portion which is contained in the assembly opening, wherein the first elastic arm is arranged on the diameter shrinkage portion, and the diameter shrinkage portion includes a hollowed area in which the first elastic arm is arranged, and the first elastic arm is provided with at least one connecting section which is connected with an edge of the hollowed area, and a clamping section is extended from the connecting section and facing the light projection portion to be matched with the fixing convex ring.

7. The outdoor lighting lamp according to claim 6, wherein the second shell comprises a tube body, and a cover arranged at one end of the tube body to provide with the ground nail thereon.

8. The outdoor lighting lamp according to claim 7, wherein one end of the tube body is formed with a rib on an inner edge where the cover is provided, and the cover comprises a plurality of second elastic arms matched with the rib to form a restraining relationship.

9. The outdoor lighting lamp according to claim 7, wherein an overall length of the tube body is greater than a length of the ground nail to store the ground nail therein.

10. The outdoor lighting lamp according to claim 8, wherein a retaining wall is provided at a side of the cover without providing the ground nail and extending into the tube body.

11. The outdoor lighting lamp according to claim 8, wherein the cover is provided with at least one auxiliary ground nail on a side provided with the ground nail.

12. The outdoor lighting lamp according to claim 1, wherein an inner wall surface of the light projection gap is provided with a reflective layer.

* * * * *